R. H. HAWKINS.
MANURE DISTRIBUTER.
APPLICATION FILED FEB. 8, 1918.

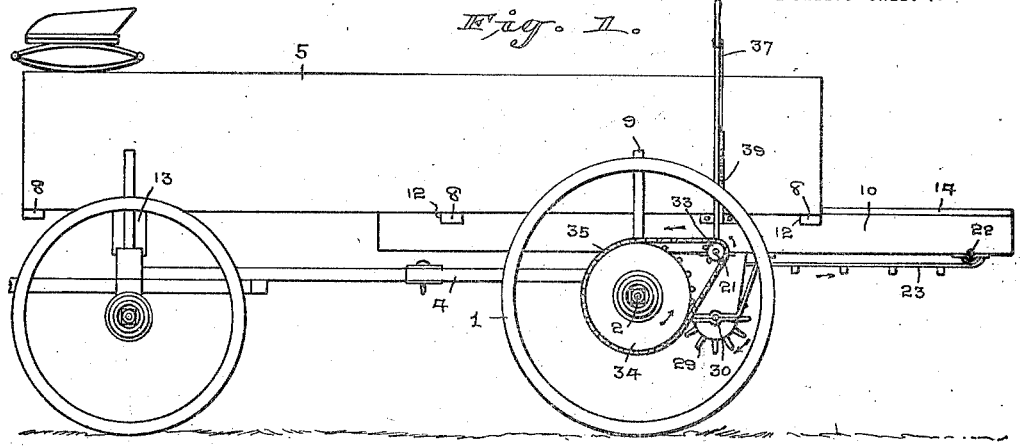
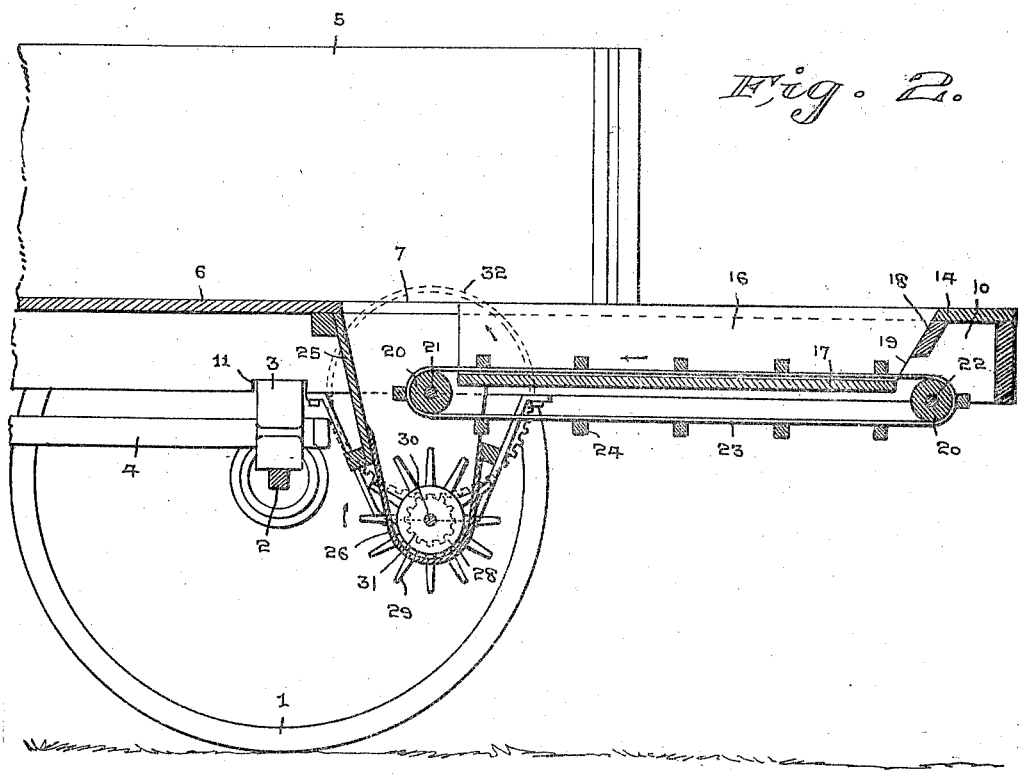

1,275,683.

Patented Aug. 13, 1918.
2 SHEETS—SHEET 2.

WITNESSES:

INVENTOR.
R. H. Hawkins
BY Fitz Gerald & Co.
ATTORNEYS

UNITED STATES PATENT OFFICE.

ROBERT H. HAWKINS, OF CROCKER, MISSOURI.

MANURE-DISTRIBUTER.

1,275,683.   Specification of Letters Patent.   Patented Aug. 13, 1918.

Application filed February 8, 1918. Serial No. 216,014.

*To all whom it may concern:*

Be it known that I, ROBERT H. HAWKINS, a citizen of the United States, residing at Crocker, in the county of Pulaski and State of Missouri, have invented certain new Manure-Distributers; and I do hereby declare the following to be a full, clear, and exact description of the invention, such as will enable others skilled in the art to which it appertains to make and use the same.

This invention relates to manure distributers, and has particular reference to an attachment for use in connection with wagon running gear and the body therefor.

The principal object of the invention is to provide a simple, efficient and reliable distributer attachment which, when arranged in operative position, will, when the manure is manually thrown into the attachment, thoroughly disintegrate it and distribute it in a single row beneath the vehicle and not scatter it over the ground between the seed rows.

A further object of the invention is to provide an attachment of the above-stated character embodying a main supporting frame adapted to be arranged on the rear portion of the vehicle running gear beneath the wagon body so as to project rearwardly therefrom to provide a platform, suitable conveyer means being arranged below a longitudinal opening in the platform to receive the manure at different points and convey the same to the disintegrating means.

A further object of the invention is to provide means for throwing the attachment into and out of gear with the rear wheel of the wagon running gear.

With these and other objects in view as will appear as the description proceeds, the invention comprises the various novel features of construction, combination and arrangement of parts as will be more fully described hereinafter and afterward specifically claimed.

Referring to the drawings,

Figure 1 represents a side elevation of the manure distributer attachment operatively associated with the wagon running gear and wagon body.

Fig. 2 represents an enlarged fragmentary vertical sectional view through the rear portion of the wagon running gear, body, and the attachment.

Figure 3:
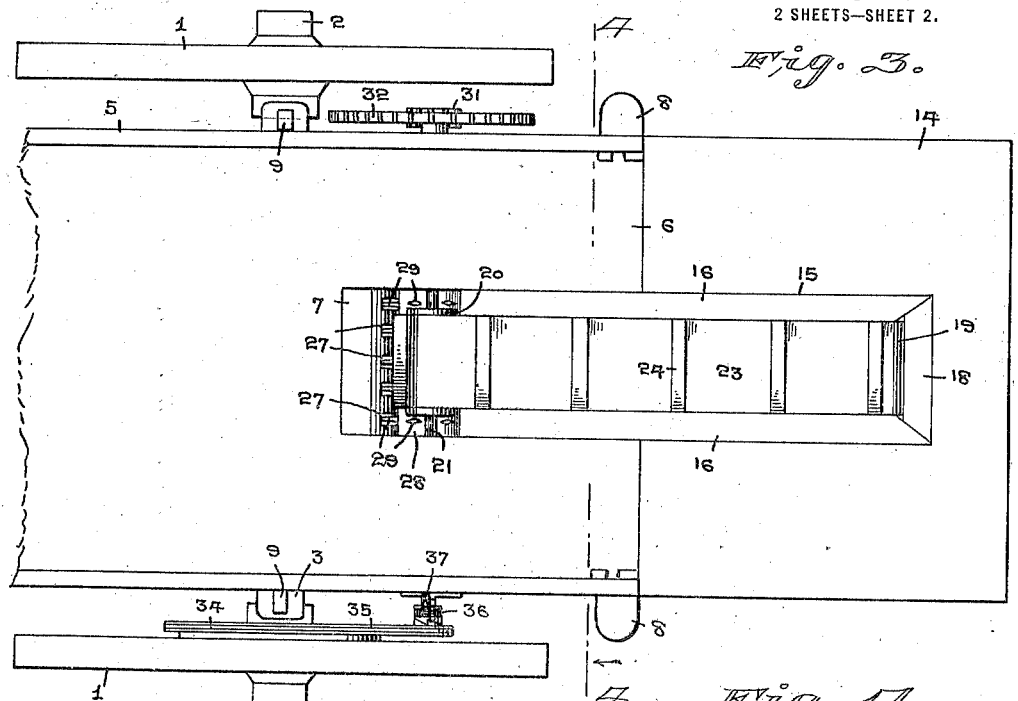
Fig. 3 represents a plan view thereof.
Figure 4:
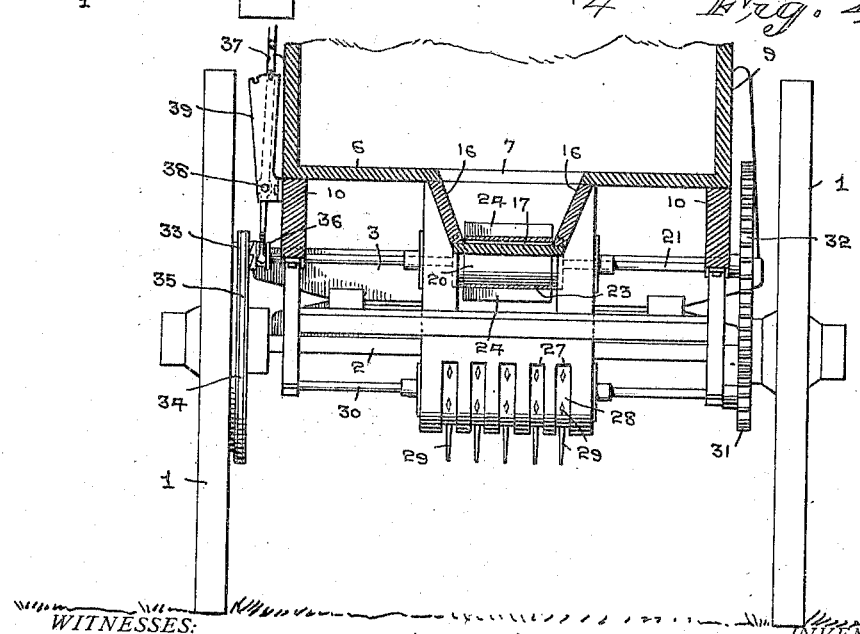
Fig. 4 represents a transverse sectional view taken on a plane indicated by the line 4—4 on Fig. 3.

In order that the construction and operation of the invention may be readily apparent to those skilled in the art to which the invention relates, I have illustrated an approved embodiment thereof in the accompanying drawings and will now proceed to fully describe the same, in connection with said drawings, in which 1 are the rear wheels of an ordinary wagon running gear, 2 the axle, 3 the bolster and 4 the rear hounds. 5 is the ordinary wagon body which is provided in its bottom 6 with a rectangular opening 7 which extends in centrally from the rear end. 8 are cleats arranged on the bottom of the wagon body and are of the usual and well known construction. 9 are the rear standards which extend upwardly from the bolster 3 and hold the body in place.

The manure distributer proper consists of a rectangular frame 10 provided in its opposite bottom edges with notches 11 adapted to receive the rear bolster 3 to hold and maintain the frame in position. The upper opposite sides of the frame are provided with notches 12 for the reception of the cleats 8, and serve to hold the body in position upon the frame. If desirable, a suitable bar 13 may be arranged on the front bolster to raise the body at its front end into a plane with the rear end thereof.

As shown, the frame 10 projects a distance beyond the rear end of the wagon and is provided with a flooring 14 to form a platform for a purpose which will presently appear. This platform is provided with a rectangular opening 15 arranged in longitudinal alinement with the opening 7.

16 are walls that converge downwardly from the opposite sides of the openings 7 and 15 and are connected by a bottom 17 to form a trough. The forward end of this trough is open while the rear end is provided with an inclined wall 18 provided at its bottom with a slot 19. 20 is a pair of rollers fixed on shafts 21 and 22 that are journaled to the under side of the frame 10 adjacent the front and rear ends respectively of the trough. An endless apron 23 provided with cleats 24 is trained around these rollers 20 so that the upper stretch passes forwardly of the vehicle through the opening 19 over the bottom 17.

25 indicates a casing inclosing the forward end of the endless apron and positioned immediately below the forward end of the opening 7. This casing is rigidly supported by the frame 10 and has its front wall inclined downwardly and rearwardly, as clearly shown in Fig. 2. A U-shaped casing 26 provided in its bottom with slots 27 is attached to the lower end of the casing 25 and has mounted therein a roller 28 provided with radially disposed teeth 29 which are adapted to rotate through the slots 27.

The roller 28 is mounted on a transverse shaft 30 extending through the casing 26 provided at one end with a pinion 31 which meshes with a large gear 32 arranged on one end of the shaft 21.

In order to rotate the shaft 21, a sprocket 33 is loosely mounted on the other end thereof and is connected to a sprocket wheel 34 mounted on the hub of the rear wheel 1 by a chain 35. 36 is a clutch collar slidably feathered on the shaft 21 and is adapted to be shifted into engagement with the sprocket 33 to cause it to rotate with the shaft 21. 37 indicates a ratchet lever pivotally mounted intermediate its ends as at 38 to a bracket 39 carried by the frame 10. The lower end of this lever is engaged with the clutch collar 36 so that when the lever is actuated, the collar will be shifted into and out of engagement with the sprocket 33.

From the foregoing description, it will be apparent that I have provided a manure distributer attachment which can be readily and operatively associated with the ordinary wagon running gear and wagon body. In the use of the attachment, the wagon is loaded with manure and a man stationed on the rear platform in position to pitch the manure into the trough on the endless apron, so that it may be readily conveyed and discharged into the disintegrating means for distribution over a single seed row. By making the trough elongated and providing an endless apron in the body thereof, it will enable the manure to be thrown into it from any point in the wagon. It is to be further noted that by the provision of the radial teeth 29 revolving through the slots 27 that all of the manure discharged from the endless apron will be thoroughly disintegrated and forced through these slots onto the seed row below. It will also be apparent that by providing the shaft 21 with a large gear and the shaft 30 with a small gear that the teeth will be caused to revolve at a greatly increased rate of speed over that of the endless apron, so that the manure as it is discharged from the endless apron will be efficiently disintegrated. When found desirable, the ratchet lever 37 can be actuated to render the device either operative or inoperative.

Having thus described my invention, what I claim as new is:—

1. The combination with a wagon running gear and wagon body, of a manure distributer embodying a main frame mounted on the running gear beneath the wagon body, a platform mounted on said main frame between the rear end of the wagon body and the rear end of the main frame and provided centrally with an opening, an endless apron mounted below said opening, and disintegrating means mounted below the discharge end of said apron.

2. The combination with a wagon running gear and wagon body, of a manure distributer attachment embodying a main frame mounted on the rear end of the wagon running gear beneath said wagon body, a platform mounted on said main frame between the rear end of the wagon body and the rear end of the main frame and provided centrally with a longitudinally extending opening, an endless apron mounted below said platform opening, disintegrating means mounted below the discharge end of said apron, means for revolving the distintegrating means at a greater rate of speed than said apron, and means for revolving said apron from the rear wheel of the wagon running gear.

3. The combination with a wagon running gear and wagon body therefor having an opening in its bottom extending inwardly from the rear end thereof, of a manure distributer attachment embodying a main frame mounted on the rear end of the wagon running gear beneath said wagon body, a platform mounted on said main frame in rear of the wagon body and provided centrally with an opening alining with said wagon body bottom opening, an endless apron mounted below said platform and wagon body bottom opening, disintegrating means mounted below the discharge end of said apron, means for driving said disintegrating means at a greater rate of speed than said endless apron, means for driving said endless apron from one of the rear wheels of the wagon running gear, and means for throwing said apron into and out of gear with said rear wheel.

4. The combination with a wagon running gear and wagon body mounted thereon, of a manure distributer attachment embodying a main frame mounted on the rear end of the running gear beneath said body, said frame being provided in its upper and lower opposite sides with notches for the reception of the rear bolster and wagon body bottom cleats to hold the frame in operative position, a platform mounted on said main frame in rear of the wagon body and provided with a longitudinal opening, an endless apron mounted below said opening, disintegrating means mounted below the discharge end of said apron, and means for simultaneously driving said disintegrating means and apron from the rear wheel of the wagon running gear.

In testimony whereof I have signed my name to this specification in the presence of two subscribing witnesses.

ROBERT H. HAWKINS.

Witnesses:
Roy W. Reed,
Goldie Hawkins.

Copies of this patent may be obtained for five cents each, by addressing the "Commissioner of Patents, Washington, D. C."